(12) United States Patent  
Roth et al.

(10) Patent No.: US 6,743,355 B2
(45) Date of Patent: Jun. 1, 2004

(54) HEATED FUEL STRAINER ASSEMBLY

(75) Inventors: Robert A. Roth, Grand Blanc, MI (US); John G. Fischer, Goodrich, MI (US); Mitchal A. Peterson, Grand Blanc, MI (US); Mohammed Aslam, Flint, MI (US)

(73) Assignee: Delphi Technologies, Inc., Troy, MI (US)

( * ) Notice: Subject to any disclaimer, the term of this patent is extended or adjusted under 35 U.S.C. 154(b) by 28 days.

(21) Appl. No.: 10/241,127

(22) Filed: Sep. 11, 2002

(65) Prior Publication Data

US 2004/0045884 A1 Mar. 11, 2004

(51) Int. Cl.^7 ........................ B01D 35/18; B01D 35/027
(52) U.S. Cl. .................... 210/175; 210/184; 210/416.4; 210/460; 210/500.1
(58) Field of Search ................................ 210/175, 184, 210/416.1, 416.4, 460, 500.1

(56) References Cited

U.S. PATENT DOCUMENTS

| 222,140 A | 12/1879 | Lindsay |
|---|---|---|
| 1,826,170 A | 10/1931 | Duggan |
| 1,890,984 A | 12/1932 | Gulick |
| 2,192,438 A | 3/1940 | Gulick |
| 2,318,220 A | 5/1943 | Haselwood |
| 2,335,096 A | 11/1943 | Zech |
| 2,448,212 A | 8/1948 | Dewey |
| 2,508,952 A | 5/1950 | Kline |
| 2,633,425 A | 3/1953 | Thompson |
| 2,788,125 A | 4/1957 | Webb |
| 3,756,412 A | * 9/1973 | Barrow ................ 210/180 |
| 4,424,422 A | 1/1984 | Bell et al. |
| 4,571,481 A | 2/1986 | Leary |
| 4,626,347 A | 12/1986 | Neglio |
| 4,997,555 A | 3/1991 | Church et al. |
| 5,146,901 A | 9/1992 | Jones |
| 5,159,915 A | 11/1992 | Saito et al. |
| 5,224,973 A | * 7/1993 | Hoppenstedt et al. ...... 55/282.3 |
| 5,293,899 A | 3/1994 | Kwon |
| 5,378,358 A | 1/1995 | Park |
| 5,547,568 A | 8/1996 | Sasaki |
| 5,560,757 A | * 10/1996 | Suzuki et al. .............. 55/516 |
| 5,620,490 A | * 4/1997 | Kawamura ............. 55/282.3 |
| 5,665,229 A | 9/1997 | Fitzpatrick et al. |
| 5,716,522 A | 2/1998 | Chilton et al. |
| 6,168,713 B1 | * 1/2001 | Sekine et al. ............. 210/172 |
| 6,170,470 B1 | 1/2001 | Clarkson et al. |
| 6,176,133 B1 | 1/2001 | Hutter et al. |
| 6,179,577 B1 | 1/2001 | Meyer |
| 6,193,885 B1 | 2/2001 | Campbell |
| 6,361,691 B1 | 3/2002 | Dockery et al. |

FOREIGN PATENT DOCUMENTS

| EP | 0 743 445 A1 | 11/1996 |
|---|---|---|
| EP | 0 743 445 B1 | 9/1998 |
| RU | 2177071 | 12/2001 |

* cited by examiner

Primary Examiner—Fred G. Prince
(74) Attorney, Agent, or Firm—Jimmy L. Funke

(57) ABSTRACT

A heated fuel strainer assembly for a fuel tank in a vehicle includes a strainer made of a metal material and adapted to be connected to an inlet of a fuel pump disposed in the fuel tank. The heated fuel strainer assembly also includes a power source connected to the strainer supply power to the strainer to heat the strainer allow fuel to flow through the strainer to the inlet.

20 Claims, 1 Drawing Sheet

FIG. 1

HEATED FUEL STRAINER ASSEMBLY

TECHNICAL FIELD

The present invention relates generally to fuel tanks for vehicles and, more particularly to a heated fuel strainer assembly for a fuel tank of a vehicle.

BACKGROUND OF THE INVENTION

It is known to provide a fuel tank for a fuel system in a vehicle to hold fuel to be used by an engine of the vehicle. In some vehicles, a fuel strainer is provided to filter a certain degree of contaminants in the fuel. These strainers are constructed from either a woven or non-woven media and their particle retention level ranges from approximately thirty (30) microns to approximately three hundred (300) microns. The contaminants range in the form of dirt and metal particles, water, and air (vapor). Typically, the fuel strainer is located at a bottom of the fuel tank and attached to an inlet of a fuel pump to filter the contaminants from the fuel before the fuel enters the fuel pump.

For diesel fuel systems, there is always a compromise between strainer filtration efficiency and cold weather performance. A strainer should be fine mesh in order to prevent particulate contamination from entering the fuel pump and damaging the fuel pump or causing accelerated wear. However, as the temperature drops, diesel fuel forms a wax, making it more difficult to pass through a strainer and reducing the output flow of the fuel pump. As a result, the fuel strainer becomes restrictive and may eventually even plug up. When this happens, the fuel pump cannot pull enough fuel through the media of the fuel strainer, causing drivability issues for the vehicle.

To lessen this effect, strainers for diesel systems are typically made of a larger mesh. This allows more wax to pass therethrough, but reduces the filtration efficiency of the strainer, allowing larger particulate contaminants to pass into the fuel pump, potentially causing more pump damage and wear. One attempt to reduce them restriction of the fuel strainer is by adding fuel heaters in separate stand-alone filters or valve bodies. However, this adds components and unnecessary complexity to the fuel system.

Therefore, it is desirable to provide a fuel strainer for a fuel tank in a vehicle that has a heater to heat the strainer to strain fuel. It is also desirable to provide a fuel strainer for a fuel tank in a vehicle that has the ability to heat the strainer without adding additional components or increasing the overall length or width of the fuel strainer. It is further desirable to provide a fuel strainer for a fuel tank in a vehicle that acts as a heating element to reduce wax build-up in diesel fuels that reduces restriction of the fuel strainer.

SUMMARY OF THE INVENTION

It is, therefore, one object of the present invention to provide a heated fuel strainer assembly for a fuel tank in a vehicle.

It is another object of the present invention to provide a heated fuel strainer assembly for a fuel tank in a vehicle that prevents wax build-up of diesel fuel, reducing fuel strainer restriction and allowing the fuel strainer to strain fuel during cold operating conditions.

To achieve the foregoing objects, the present invention is a heated fuel strainer assembly for a fuel tank in a vehicle including a strainer made of a metal material and adapted to be connected to an inlet of a fuel pump disposed in the fuel tank. The heated fuel strainer assembly also includes a power source connected to the strainer to supply power to the strainer to heat the strainer and allow fuel to flow through the strainer to the inlet.

One advantage of the present invention is that a heated fuel strainer assembly is provided for a fuel tank in a vehicle. Another advantage of the present invention is that the heated fuel strainer assembly retains improved filtration of the fine mesh strainer and still prevents wax from plugging up the strainer. Yet another advantage of the present invention is that the heated fuel strainer assembly has the ability to heat the strainer without adding additional components and without increasing the overall length or width of the fuel strainer.

Other objects, features, and advantages of the present invention will be readily appreciated, as the same becomes better understood, after reading the subsequent description taken in conjunction with the accompanying drawings.

DESCRIPTION OF THE PREFERRED EMBODIMENT

Figure 1:
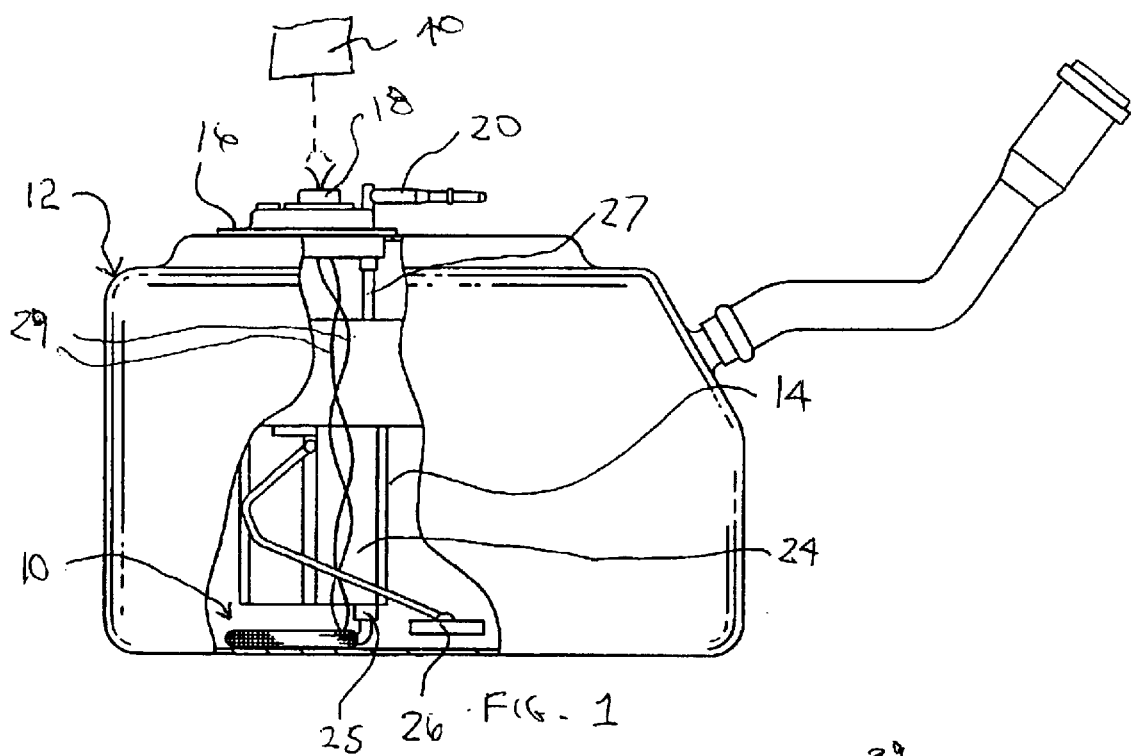
FIG. 1 is a fragmentary elevational view of a heated fuel strainer assembly, according to the present invention, illustrated in operational relationship with a fuel tank.
Figure 2:
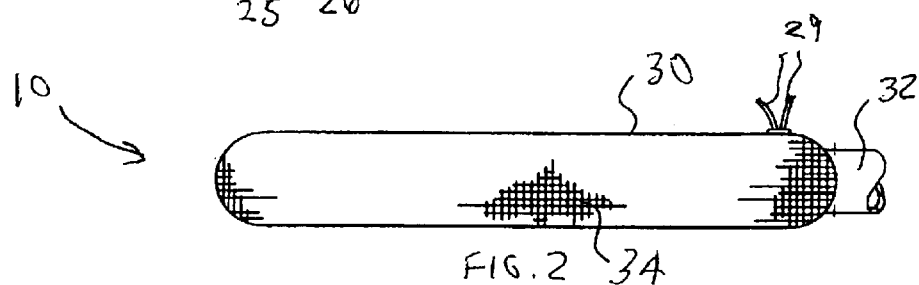
FIG. 2 is an elevational view of the heated fuel strainer assembly of FIG. 1.

Referring to the drawings and in particular FIGS. 1 and 2, one embodiment of a heated fuel strainer assembly 10, according to the present invention, is shown for a fuel tank, generally indicated at 12, in a vehicle (not shown). The fuel tank 12 includes a fuel-sending unit 14 disposed therein having a removable cover 16 sealed to the top of the fuel tank 12 with an electrical connector 18 and a fuel line connector 20. The fuel-sending unit 14 also includes an electrical fuel pump 24 with an inlet 25 at a bottom thereof and a float gage 26 to indicate fuel level. The fuel-sending unit 14 includes a fuel tube 27 connected to the fuel line connector 20 and the fuel pump 24 by a coupler (not shown). The fuel-sending unit 14 also includes electrical wires 29 interconnecting the electrical connector 18 and the heated fuel strainer assembly 10. The heated fuel strainer assembly 10 is connected to the inlet 25 of the fuel pump 24 and is positioned close to a bottom of the fuel tank 12. The fuel tank 12 is formed of a metal material or plastic material. It should be appreciated that the heated fuel, strainer assembly 10 may connected to a fuel module (not shown). It should also be appreciated that electrical wires (not shown) interconnect the electrical connector 18 and the fuel pump 24. It should further be appreciated that, except for the heated fuel strainer assembly 10, the fuel tank 12 and fuel-sending unit 14 are conventional and known in the art.

Figure 3:
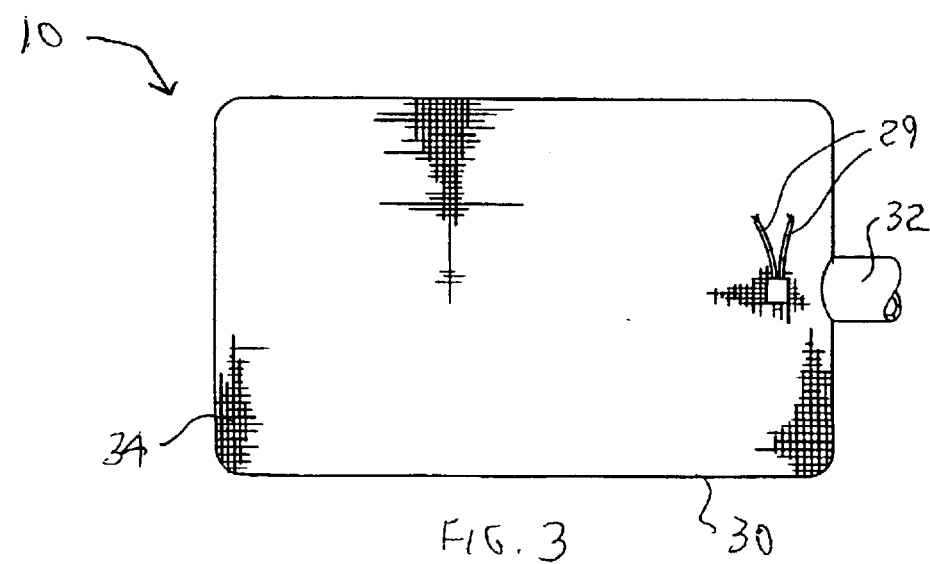
FIG. 3 is a plan view of the heated fuel strainer assembly of FIG. 1.

Referring to FIGS. 1 through 3, the heated fuel strainer assembly 10 includes a fuel strainer 30 extending longitudinally. The fuel strainer 30 is generally rectangular in shape, but may be any suitable shape. The fuel strainer 30 has a connector 32 connected to the inlet 25 of the fuel pump 24. The connector 32 is made of a rigid material such as metal or plastic, preferably nylon or acetal. The fuel strainer 30 includes a filtration member 34 connected to the connector 32. The filtration member 34 is fabricated from a woven or nonwoven filtering material made of a metal material, preferably a steel mesh, to allow fuel to pass therethrough to the fuel pump 24, but prevent certain contaminants from passing therethrough to the fuel pump 24. The filtration member 34 has a particle retention rating of approximately thirty (30) microns to approximately eighty (80) microns. The filtration member 34 may be one or more layers connected to the connector 32 by conventional means. The electrical wires 29 interconnect the electrical connector 18 and the filtration member 34. It should be appreciated that the filtration member 34 may be modified to accept an electrical connector (not shown) and the filtration member 34 acts as a heating element. It should also be appreciated that the heating element could be an outer layer of a two-layer fuel strainer and that the inner layer could be made of a finer mesh fabric to further enhance the wicking capabilities of the fuel strainer 30.

In operation, upon vehicle start-up, the current is supplied by a power source 40 (FIG. 1) to the fuel strainer 30, causing the filtration member 34 to heat and melt any wax present in the diesel fuel. This allows the diesel fuel to easily pass through the filtration member 34 to the fuel pump 24 in an unrestrictive manner. It should be appreciated that the heating cycle could be controlled by a number of schemes, including but not limited to, a timed cycle on every vehicle start-up, or a temperature cycle controlled by a thermistor (not shown) with power applied until a preset temperature is reached. It should also be appreciated that a switch (not shown) could be located internal to the fuel strainer 30 which would make connection and turn on and the filtration member 34 would heat-up when the fuel is restrictive enough to cause strainer deformation under pump inlet suction. It should further be appreciated that, as the fuel is heated, the restriction would lessen to the point where the strainer switch would break the connection and turn off power to the filtration member 34.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A heated fuel strainer assembly for a fuel tank in a vehicle comprising:
    a strainer made of a metal material and adapted to be connected to an inlet of a fuel pump disposed in the fuel tank; and
    a power source connected to said strainer to supply power to said strainer to heat said strainer and allow fuel to flow through said strainer to the inlet.

2. A heated fuel strainer assembly as set forth in claim 1 wherein said strainer extends longitudinally.

3. A heated fuel strainer assembly as set forth in claim 2 wherein said strainer has a longitudinal end adapted to be connected to the inlet.

4. A heated fuel strainer assembly as set forth in claim 1 wherein said strainer is generally rectangular in shape.

5. A heated fuel strainer assembly as set forth in claim 1 wherein said strainer comprises a filtration member.

6. A heated fuel strainer assembly as set forth in claim 5 wherein said filtration member comprises a mesh having a particle retention rating of approximately thirty microns to approximately eighty microns.

7. A heated fuel strainer assembly as set forth in claim 6 wherein said filtration member is made of a metal material.

8. A heated fuel strainer assembly as set forth in claim 7 wherein said metal material is steel.

9. A heated fuel strainer assembly as set forth in claim 5 including electrical wires interconnecting said filtration member and said power source.

10. A heated fuel strainer assembly as set forth in claim 1 wherein said strainer includes a connector for connection to the inlet of the fuel pump.

11. A heated fuel strainer assembly as set forth in claim 10 wherein said connector is made of either one of a metal material and a plastic material.

12. A heated fuel strainer assembly for a fuel tank in a vehicle comprising:
    a fuel pump having an inlet;
    a strainer made of a metal material and extending longitudinally between a first longitudinal end and a second longitudinal end, said first longitudinal end being connected to said inlet; and
    a power source connected to said strainer to supply power to said strainer to heat said strainer and allow diesel fuel to flow through said strainer to said inlet.

13. A heated fuel strainer assembly as set forth in claim 12 wherein said strainer is generally rectangular in shape.

14. A heated fuel strainer assembly as set forth in claim 12 wherein said strainer comprises a filtration member.

15. A heated fuel strainer assembly as set forth in claim 14 wherein said filtration member comprises a mesh having a particle retention rating of approximately thirty microns to approximately eighty microns.

16. A heated fuel strainer assembly as set forth in claim 15 wherein said filtration member is made of a metal material.

17. A heated fuel strainer assembly as set forth in claim 16 wherein said metal material is steel.

18. A heated fuel strainer assembly as set forth in claim 14 including electrical wires interconnecting said filtration member and said power source.

19. A heated fuel strainer assembly as set forth in claim 12 wherein said strainer includes a connector for connection to the inlet of the fuel pump.

20. A fuel tank assembly for a vehicle comprising:
    a fuel tank;
    a fuel pump disposed in said fuel tank and having an inlet;
    a heated fuel strainer assembly operatively connected to said inlet; and
    said heated fuel strainer assembly comprising a strainer made of a metal material and extending longitudinally between a first longitudinal end and a second longitudinal end, said first longitudinal end being connected to said inlet of said fuel pump, and a power source connected to said strainer to supply power to said strainer to heat said strainer and allow diesel fuel to flow through said strainer to said inlet.

* * * * *